United States Patent
Yoshioka et al.

(10) Patent No.: US 11,673,214 B2
(45) Date of Patent: Jun. 13, 2023

(54) LEAD-FREE SOLDER

(71) Applicant: Uchihashi Estec Co., Ltd., Osaka (JP)

(72) Inventors: Yoshihiro Yoshioka, Osaka (JP); Kazuo Inada, Osaka (JP); Tomokuni Mitsui, Osaka (JP); Hitoshi Yamanaka, Osaka (JP)

(73) Assignee: Uchihashi Estec Co., Ltd., Osaka (JP)

( * ) Notice: Subject to any disclaimer, the term of this patent is extended or adjusted under 35 U.S.C. 154(b) by 0 days.

(21) Appl. No.: 17/664,907

(22) Filed: May 25, 2022

(65) Prior Publication Data
US 2022/0379411 A1 Dec. 1, 2022

(30) Foreign Application Priority Data
May 26, 2021 (JP) .............. JP2021-088449

(51) Int. Cl.
*B23K 35/26* (2006.01)
*C22C 28/00* (2006.01)

(52) U.S. Cl.
CPC .............. *B23K 35/26* (2013.01); *C22C 28/00* (2013.01)

(58) Field of Classification Search
CPC ................................ B23K 35/26; C22C 28/00
See application file for complete search history.

(56) References Cited

U.S. PATENT DOCUMENTS

| 2012/0222893 A1* | 9/2012 | Hwang | B23K 35/26 174/257 |
| 2017/0190004 A1 | 7/2017 | Hwang et al. | |
| 2018/0207753 A1 | 7/2018 | Hwang et al. | |

FOREIGN PATENT DOCUMENTS

| JP | 2013233577 A | * 11/2013 |
| JP | 2020-040127 A | 3/2020 |

OTHER PUBLICATIONS

JP 2013-233577 JPlatPat Translation (Year: 2022).*

* cited by examiner

*Primary Examiner* — Alexandra M Moore
(74) *Attorney, Agent, or Firm* — Oblon, McClelland, Maier & Neustadt, L.L.P.

(57) ABSTRACT

A lead-free solder contains 93.0 mass % or more and 98.95 mass % or less of indium, 1.0 mass % or more and 4.0 mass % or less of tin, and an addition metal. The addition metal contains at least one of silver, antimony, copper, or nickel. The addition metal is neither indium nor tin. The total of mass percentage of the addition metal is 0.05 mass % or more and 6.0 mass % or less. The sum of the total mass percentage of the addition metal, the mass percentage of indium, and the mass percentage of tin is 100 mass % or less.

2 Claims, 4 Drawing Sheets

| | COMPONENT [mass%] | | | | | | CREEP RUPTURE TIME AT HIGH TEMPERATURES [hr] | BOND STRENGTH AT NORMAL TEMPERATURE [N] | BOND STRENGTH AT 120°C [N] | SPECIFIC RESISTANCE [μΩ·cm] | SOLIDUS TEMPERATURE [°C] | LIQUIDUS TEMPERATURE [°C] |
|---|---|---|---|---|---|---|---|---|---|---|---|---|
| | In | Sn | Ag | Sb | Cu | Ni | | | | | | |
| EXAMPLE 1 | 98.0 | 1.0 | 1.0 | 0 | 0 | 0 | OVER 600 | 9.2 | 4.7 | 10.0 | 145 | 152 |
| EXAMPLE 2 | 96.5 | 1.0 | 1.5 | 1.0 | 0 | 0 | OVER 600 | 12.3 | 5.8 | 10.9 | 142 | 148 |
| EXAMPLE 3 | 96.5 | 1.0 | 1.5 | 0 | 1.0 | 0 | OVER 600 | 7.9 | 6.3 | 9.9 | 145 | 151 |
| EXAMPLE 4 | 93.5 | 3.0 | 1.5 | 1.0 | 1.0 | 0 | OVER 600 | 10.2 | 5.9 | 11.9 | 143 | 149 |
| EXAMPLE 5 | 94.0 | 1.0 | 3.0 | 1.0 | 1.0 | 0 | OVER 600 | 8.8 | 6.7 | 11.8 | 144 | 149 |
| EXAMPLE 6 | 93.9 | 1.0 | 3.0 | 1.0 | 1.0 | 0.1 | OVER 600 | 10.3 | 6.4 | 11.7 | 143 | 148 |
| COMPARATIVE EXAMPLE 1 | 70.0 | 29.0 | 1.0 | 0 | 0 | 0 | 100 OR LESS | 9.0 | 2.8 | 17.3 | 121 | 127 |
| COMPARATIVE EXAMPLE 2 | 78.0 | 20.0 | 2.0 | 0 | 0 | 0 | 100 TO 600 | 8.1 | 3.8 | 15.9 | 127 | 131 |
| COMPARATIVE EXAMPLE 3 | 83.0 | 10.0 | 5.0 | 1.0 | 1.0 | 0 | 100 TO 600 | 9.9 | 4.2 | 13.6 | 131 | 138 |

FIG. 1

| | COMPONENT [mass%] | | | | | | CREEP RUPTURE TIME AT HIGH TEMPERATURES [hr] | BOND STRENGTH AT NORMAL TEMPERATURE [N] | BOND STRENGTH AT 120°C [N] | SPECIFIC RESISTANCE [μΩ·cm] | SOLIDUS TEMPERATURE [°C] | LIQUIDUS TEMPERATURE [°C] |
|---|---|---|---|---|---|---|---|---|---|---|---|---|
| | In | Sn | Ag | Sb | Cu | Ni | | | | | | |
| EXAMPLE 1 | 98.0 | 1.0 | 1.0 | 0 | 0 | 0 | OVER 600 | 9.2 | 4.7 | 10.0 | 145 | 152 |
| EXAMPLE 2 | 96.5 | 1.0 | 1.5 | 1.0 | 0 | 0 | OVER 600 | 12.3 | 5.8 | 10.9 | 142 | 148 |
| EXAMPLE 3 | 96.5 | 1.0 | 1.5 | 0 | 1.0 | 0 | OVER 600 | 7.9 | 6.3 | 9.9 | 145 | 151 |
| EXAMPLE 4 | 93.5 | 3.0 | 1.5 | 1.0 | 1.0 | 0 | OVER 600 | 10.2 | 5.9 | 11.9 | 143 | 149 |
| EXAMPLE 5 | 94.0 | 1.0 | 3.0 | 1.0 | 1.0 | 0 | OVER 600 | 8.8 | 6.7 | 11.8 | 144 | 149 |
| EXAMPLE 6 | 93.9 | 1.0 | 3.0 | 1.0 | 1.0 | 0.1 | OVER 600 | 10.3 | 6.4 | 11.7 | 143 | 148 |
| COMPARATIVE EXAMPLE 1 | 70.0 | 29.0 | 1.0 | 0 | 0 | 0 | 100 OR LESS | 9.0 | 2.8 | 17.3 | 121 | 127 |
| COMPARATIVE EXAMPLE 2 | 78.0 | 20.0 | 2.0 | 0 | 0 | 0 | 100 TO 600 | 8.1 | 3.8 | 15.9 | 127 | 131 |
| COMPARATIVE EXAMPLE 3 | 83.0 | 10.0 | 5.0 | 1.0 | 1.0 | 0 | 100 TO 600 | 9.9 | 4.2 | 13.6 | 131 | 138 |

LEAD-FREE SOLDER

BACKGROUND OF THE INVENTION

(1) Field of the Invention

The present invention relates to a lead-free solder.

(2) Description of Related Art

JP 2020-040127 A discloses a lead-free solder. The lead-free solder includes about 4 mass % to about 25 mass % of tin, about 0.1 mass % to about 8 mass % of antimony, about 0.03 mass % to about 4 mass % of copper, about 0.03 mass % to about 4 mass % of nickel, about 66 mass % to about 90 mass % of indium, and about 0.5 mass % to about 9 mass % of silver. The invention disclosed in JP 2020-040127 A is suitable for use on glass and endures use in high-temperature environments.

SUMMARY OF THE INVENTION

The lead-free solder disclosed in JP 2020-040127 A has, however, still room for improvement in creep property. The present invention is to solve the problem. It is, therefore, an object of the present invention to provide a lead-free solder that further excels in creep property.

The present inventors have found from their thorough investigations that a lead-free solder having excellent creep property is obtainable, by limiting the amount of addition of a predetermined metal relative to indium, so as to satisfy a certain requirement, which led us to the present invention. That is, the present invention is described as follows.

According to one aspect of the present invention aimed at solving the aforementioned problem, there is provided a lead-free solder that contains 93 mass % or more and 98.95 mass % or less of indium, 1.0 mass % or more and 4.0 mass % or less of tin, and an addition metal whose total mass is 0.05 mass % or more and 6.0 mass % or less. The addition metal contains at least one of silver, antimony, copper, or nickel, which is neither indium nor tin. The sum of the total mass percentage of the addition metal, the mass percentage of indium, and the mass percentage of tin is 100 mass % or less.

The lead-free solder preferably contains 0.1 mass % or more and 6.0 mass % or less of antimony, as a part of the addition metal.

The lead-free solder preferably contains 0.05 mass % or more and 6.0 mass % or less of copper, as a part of the addition metal.

The lead-free solder preferably contains more than 1.0 mass % and 6.0 mass % or less of silver, as a part of the addition metal.

The mass percentage of indium is preferably 93.5 mass % or more and 96.5 mass % or less.

The present invention can provide a lead-free solder that further excels in creep property.

BRIEF DESCRIPTION OF THE DRAWINGS

FIG. 1 is a table summarizing components and test results of lead-free solders in Examples of the present invention and Comparative Examples;

DETAILED DESCRIPTION OF PREFERRED EMBODIMENTS

Figure 2:
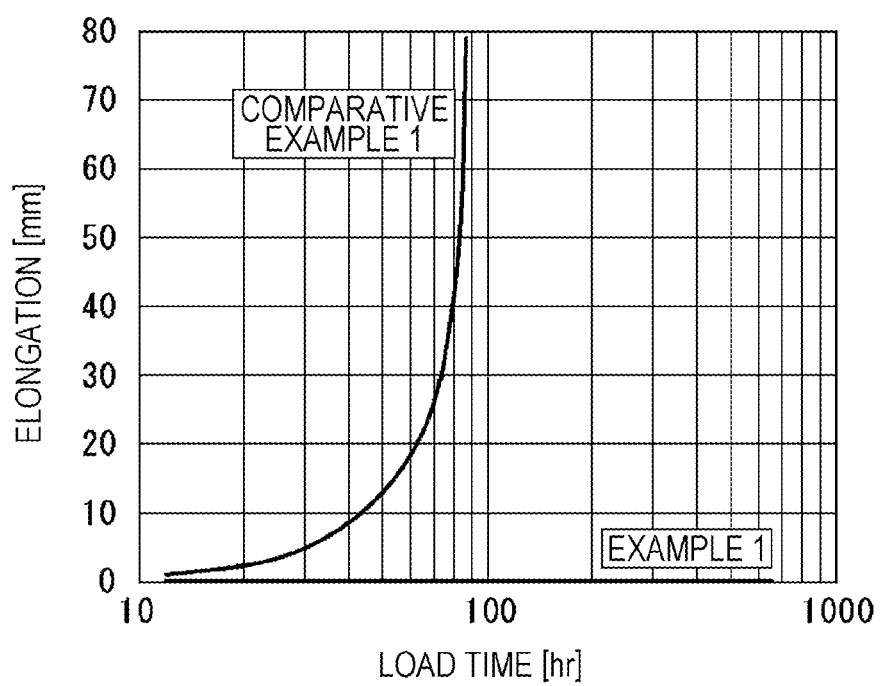
FIG. 2 is a graph illustrating relationship between time lapse and elongation, observed in high temperature creep tests in Example 1 of the present invention and Comparative Example 1.

Embodiments of the present invention will be explained below.

<Description on Components of Lead-Free Solder>

The lead-free solder of the present invention contains indium, tin, and an addition metal. The mass percentage of indium in the lead-free solder of the present invention is 93.0 mass % or more and 98.95 mass % or less. The mass percentage of tin in the lead-free solder of the present invention is 1.0 mass % or more and 3.0 mass % or less. The total mass percentage of the addition metal in the lead-free solder of the present invention is 0.05 mass % or more and 6.0 mass % or less. In the lead-free solder of the present invention, the sum of the total mass percentage of the addition metal, the mass percentage of indium, and the mass percentage of tin is 100 mass % or less.

The addition metal contains at least one of silver, antimony, copper, or nickel. The addition metal is neither indium nor tin. Type of metal contained in the addition metal is not particularly limited, so long as at least one of silver, antimony, copper, or nickel is contained, and that the addition metal is neither indium nor tin. Hence, the addition metal may be one selected from the group consisting of silver, antimony, copper, nickel, and any combinations thereof. The total mass percentage of the addition metal in this case is more than 0.05 mass % and less than 6.0 mass %. Each metal contained in the addition metal constitutes a component of the lead-free solder of the present invention. Hence in the lead-free solder of the present invention, the total mass percentage of the metal, neither indium nor tin, will be 0.05 mass % or more and 6.0 mass % or less.

So long as at least one of silver, antimony, copper, or nickel is contained, and the addition metal is neither indium nor tin, the metal contained in the addition metal may be only any of those having predetermined properties. The "predetermined properties" are exemplified by being a transition metal, being a noble metal, being a base metal, forming a crystal lattice categorized in a predetermined crystal system, forming a close-packed structure, and forming a crystal twinning. The predetermined crystal system is exemplified by triclinic crystal, monoclinic crystal, orthorhombic crystal, tetragonal crystal, hexagonal crystal, and cubic crystal.

The lead-free solder of the present invention preferably contains 0.1 mass % or more and 6.0 mass % or less of antimony, as a part of the addition metal. The lead-free solder of the present invention preferably contains 0.05 mass % or more and 6.0 mass % or less of copper, as a part of the addition metal. The lead-free solder of the present invention preferably contains 0.05 mass % or more and 6.0 mass % or less of nickel, as a part of the addition metal. The lead-free solder of the present invention preferably contains more than 1.0 mass % and 6.0 mass % or less of silver, as a part of the addition metal.

The mass percentage of indium in the present invention is preferably 93.5 mass % or more and 96.5 mass % or less.

<Description of Production Method>

Production method of the lead-free solder of the present invention is not particularly limited. The lead-free solder of the present invention is produced by melting an indium ingot, a tin ingot, and an addition metal in a crucible, for example. The addition metal may be melted in the crucible as a lead-free solder containing at least one of silver, antimony, copper, and nickel; or ingots of the individual metals to be included in the addition metal may be melted in the crucible. Alternatively, metal powder may be melted in place of the ingot. Purities of the indium ingot, the tin ingot, and the ingots of the individual metals to be included in the addition metal are preferably as high as possible. For example, the purities of these metals are preferably 99% or higher.

DESCRIPTION ON EXAMPLES

The paragraphs below will describe Examples of the present invention, to which the present invention is, however, not limited.

Example 1

Preparation of Lead-Free Solder Ingot

First, 98.0 g of indium, 1.0 g of tin, and 1.0 g of silver were placed in a crucible. Upon placement of these metals into the crucible, the crucible containing the metals was placed on a gas stove and heated for 10 minutes. Temperature of the molten metal was 400° C. (673.15K). These metals were thus alloyed. The molten metal (molten alloy) in the crucible was then poured into a mold. The mold with the molten metal poured therein was then air-cooled. The alloy in the mold was thus air-cooled. After the alloy was cooled down to normal temperature, the alloy was taken out from the mold. This alloy is an ingot of the lead-free solder of this Example. Specimens for the tests below were prepared from the ingot.

High Temperature Creep Test

First, a specimen was prepared from the lead-free solder ingot of this Example. The specimen was measured 130 mm in length. The specimen was widened at both ends and narrowed at the center. The specimen was male threaded at both end portions. The male thread had a nominal diameter M18 specified in the Japanese Industrial Standards (JIS) B0205. The specimen had a circular cross-sectional shape at the center portion and had an outer diameter of 10 mm. The specimen had a length of the center portion, or a gauge length, of 70 mm. The specimen had a curved face between the center portion and each end portion, with a radius of curvature of 15 mm. The specimen was set on a triple creep tester (Model: YCR-250) from Yonekura Mfg. Co., Ltd., to which 0.24 N load was applied. Time from application of load to the specimen, up to fracture of the specimen, was measured. The specimen was kept at 120° C. (393.15K) while the load was applied thereto. The specimen of this Example was found not to be ruptured, after 600 hours from the start of load application. Hence, the test was finished.

Bond Strength Test on Silver Electrode at Normal Temperature

On a silver electrode (2.5 mm×10 mm) formed on a ceramic board (11 mm×11 mm), the lead-free solder of this Example was placed in a 2 mm×3 mm area with a thickness of 0.4 mm. Upon placement of the lead-free solder, there was coated a rosin flux (Model: NUR-813, from Uchihashi Estec Co., Ltd.). Upon coating of the flux, a copper wire of 40 mm in length and 0.55 mm in diameter was placed thereon. Upon placement of the copper wire, a 3 mm long portion at the end of the copper wire was heated under a soldering iron, to solder the copper wire to the electrode. This is a bond strength test specimen of this Example. Upon manufacture of the bond strength test specimen, a weight was placed on the ceramic board of the bond strength test specimen. The ceramic board was thus immobilized so as not to float. Upon immobilization of the ceramic board, the copper wire of the bond strength test specimen was then pulled up with use of a pull gauge (Model: AWF-30N, from Aikoh Engineering Co., Ltd.). A maximum load indicated by the pull gauge, in a period from the start of pulling up to fracture of the lead-free solder used for soldering, was then measured. The maximum load in this Example was 9.2 N.

Bond Strength Test on Silver Electrode at High Temperatures

A bond strength test specimen was prepared in the same manner as in the "Bond Strength Test on Silver Electrode at Normal Temperature". The thus prepared bond strength test specimen was placed on a hot plate (a plate on which the object to be heated is placed and heated), kept at 120° C. (393.15K), of a hot plate (Model: PC-400, from Corning Inc.), and was allowed to stand for 3 minutes. After 3-minute standing, a weight was placed on the ceramic board of the bond strength test specimen. The ceramic board was thus immobilized on the hot plate so as not to float. Upon immobilization of the ceramic board, the copper wire of the bond strength test specimen was then pulled up with use of a pull gauge (Model: AWF-30N, from Aikoh Engineering Co., Ltd.). A maximum load indicated by the pull gauge, in a period from the start of pulling up to fracture of the lead-free solder used for soldering, was then measured. The maximum load in this Example was 4.7 N.

Specific Resistance Test

First, a specimen was prepared from the lead-free solder ingot of this Example. The specimen was a wire of 2 mm (0.2 cm) in diameter. Next, electric resistance between two points (distance: 100 mm) of the wire was measured with use of mΩ HiTESTER (Model: 3224), from Hioki E.E. Corporation. With the thus measured electric resistance, specific resistance of the lead-free solder of this Example was calculated by the equation below.

$$\rho = R \times S \div L$$

In the equation, ρ represents specific resistance. The unit is microohm centimeter (μΩ·cm). R represents the measured electric resistance. The unit is microohm. S represents a cross-sectional area of the wire. The unit is square centimeter. L represents the distance between two points at which the electric resistance was measured. The unit is centimeter. The specific resistance in this Example was 10.0 μΩ·cm.

Measurement of Solidus Temperature and Liquidus Temperature

Solidus temperature and liquidus temperature of the lead-free solder of this Example was measured with use of a differential scanning calorimeter (Model: DSC8231, from Rigaku Corporation). The measurement was carried out in the air. Temperature rise rate during the measurement was set to 5° C. per minute (5K per minute). Mass of the sample used for the measurement was 15 mg. The sample was measured in an aluminum container. Cycle of temperature measurement was one second. Air in the same aluminum container was used as a reference. That is, endotherm and exotherm associated with the phase transition and temperature at which the phase transition occurred (solidus temperature and liquidus temperature) were measured, by comparing the specimen in the container and the air in the vacant container. The solidus temperature in this Example was 145° C. (418.15K). The liquidus temperature in this Example was 152° C. (425.15K).

Example 2

Preparation of Lead-Free Solder

First, 96.5 g of indium, 1.0 g of tin, 1.5 g of silver, and 1.0 g of antimony were placed in a crucible. Thereafter, a lead-free solder ingot of this Example was prepared by the same procedures as in Example 1.

High Temperature Creep Test

The high temperature creep test was conducted according to the same procedures as in Example 1. Also, the specimen of this Example was found not to be ruptured, after 600 hours from the start of load application. Hence, the test was finished.

Bond Strength Test on Silver Electrode at Normal Temperature

The bond strength test on the silver electrode at normal temperature was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 12.3 N.

Bond Strength Test on Silver Electrode at High Temperatures

The bond strength test on the silver electrode at high temperatures was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 5.8 N.

Specific Resistance Test

The specific resistance was measured according to the same procedures as in Example 1. The specific resistance of the lead-free solder of this Example was 10.9 μΩ·cm.

Measurement of Solidus Temperature and Liquidus Temperature

The solidus temperature and the liquidus temperature were measured according to the same procedures as in Example 1. The solidus temperature of the lead-free solder of this Example was 142° C. (415.15K). The liquidus temperature of the lead-free solder of this Example was 148° C. (421.15K).

Example 3

Preparation of Lead-Free Solder

First, 96.5 g of indium, 1.0 g of tin, 1.5 g of silver, and 1.0 g of copper were placed in a crucible. Thereafter, a lead-free solder ingot of this Example was prepared by the same procedures as in Example 1.

High Temperature Creep Test

The high temperature creep test was conducted according to the same procedures as in Example 1. Also, the specimen of this Example was found not to be ruptured, after 600 hours from the start of load application. Hence, the test was finished.

Bond Strength Test on Silver Electrode at Normal Temperature

The bond strength test on the silver electrode at normal temperature was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 7.9 N.

Bond Strength Test on Silver Electrode at High Temperatures

The bond strength test on the silver electrode at high temperatures was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 6.3 N.

Specific Resistance Test

The specific resistance was measured according to the same procedures as in Example 1. The specific resistance of the lead-free solder of this Example was 9.9 μΩ·cm.

Measurement of Solidus Temperature and Liquidus Temperature

The solidus temperature and the liquidus temperature were measured according to the same procedures as in Example 1. The solidus temperature of the lead-free solder of this Example was 145° C. (418.15K). The liquidus temperature of the lead-free solder of this Example was 151° C. (424.15K).

Example 4

Preparation of Lead-Free Solder

First, 93.5 g of indium, 3.0 g of tin, 1.5 g of silver, 1.0 g of antimony, and 1.0 g of copper were placed in a crucible. Thereafter, a lead-free solder ingot of this Example was prepared by the same procedures as in Example 1.

High Temperature Creep Test

The high temperature creep test was conducted according to the same procedures as in Example 1. Also, the specimen of this Example was found not to be ruptured, after 600 hours from the start of load application. Hence, the test was finished.

Bond Strength Test on Silver Electrode at Normal Temperature

The bond strength test on the silver electrode at normal temperature was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 10.2 N.

Bond Strength Test on Silver Electrode at High Temperatures

The bond strength test on the silver electrode at high temperatures was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 5.9 N.

Specific Resistance Test

The specific resistance was measured according to the same procedures as in Example 1. The specific resistance of the lead-free solder of this Example was 11.9 μΩ·cm.

Measurement of Solidus Temperature and Liquidus Temperature

The solidus temperature and the liquidus temperature were measured according to the same procedures as in Example 1. The solidus temperature of the lead-free solder of this Example was 143° C. (416.15K). The liquidus temperature of the lead-free solder of this Example was 149° C. (422.15K).

Example 5

Preparation of Lead-Free Solder

First, 94.0 g of indium, 1.0 g of tin, 3.0 g of silver, 1.0 g of antimony, and 1.0 g of copper wire was placed in a crucible. Thereafter, a lead-free solder ingot of this Example was prepared by the same procedures as in Example 1.

High Temperature Creep Test

The high temperature creep test was conducted according to the same procedures as in Example 1. The specimen of this Example was found not to be ruptured, after 600 hours from the start of load application. Hence, the test was finished.

Bond Strength Test on Silver Electrode at Normal Temperature

The bond strength test on the silver electrode at normal temperature was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 8.8 N.

Bond Strength Test on Silver Electrode at High Temperatures

The bond strength test on the silver electrode at high temperatures was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 6.7 N.

Specific Resistance Test

The specific resistance was measured according to the same procedures as in Example 1. The specific resistance of the lead-free solder of this Example was 11.8 μΩ·cm.

Measurement of Solidus Temperature and Liquidus Temperature

The solidus temperature and the liquidus temperature were measured according to the same procedures as in Example 1. The solidus temperature of the lead-free solder of this Example was 144° C. (417.15K). The liquidus temperature of the lead-free solder of this Example was 149° C. (422.15K).

Example 6

Preparation of Lead-Free Solder

First, 93.9 g of indium, 1.0 g of tin, 3.0 g of silver, 1.0 g of antimony, 1.0 g of copper, and 0.1 g of nickel were placed in a crucible. Thereafter, a lead-free solder ingot of this Example was prepared by the same procedures as in Example 1.

High Temperature Creep Test

The high temperature creep test was conducted according to the same procedures as in Example 1. Also, the specimen of this Example was found not to be ruptured, after 600 hours from the start of load application. Hence, the test was finished.

Bond Strength Test on Silver Electrode at Normal Temperature

The bond strength test on the silver electrode at normal temperature was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 10.3 N.

Bond Strength Test on Silver Electrode at High Temperatures

The bond strength test on the silver electrode at high temperatures was conducted according to the same procedures as in Example 1. In the bond strength test of this Example, a maximum load indicated by the pull gauge, in a period from the start of pulling up of the copper wire of the bond strength test specimen up to fracture of the lead-free solder used for soldering, was 6.4 N.

Specific Resistance Test

The specific resistance was measured according to the same procedures as in Example 1. The specific resistance of the lead-free solder of this Example was 11.7 μΩ·cm.

Measurement of Solidus Temperature and Liquidus Temperature

The solidus temperature and the liquidus temperature were measured according to the same procedures as in Example 1. The solidus temperature of the lead-free solder of this Example was 143° C. (416.15K). The liquidus temperature of the lead-free solder of this Example was 148° C. (421.15K).

Comparative Example 1

Preparation of Lead-Free Solder

First, 70.0 g of indium, 29.0 g of tin, and 1.0 g of silver were placed in a crucible. Thereafter, a lead-free solder ingot of this Comparative Example was prepared by the same procedures as in Example 1.

High Temperature Creep Test

The high temperature creep test was conducted according to the same procedures as in Example 1. The specimen of this Comparative Example was ruptured, slightly before 90 hours have elapsed from the start of the load application, that is, before 100 hours have elapsed.

Bond Strength Test on Silver Electrode at Normal Temperature

The bond strength test on the silver electrode at normal temperature was conducted according to the same procedures as in Example 1. In the bond strength test of this Comparative Example, a maximum load indicated by the pull gauge, in a period from the start of pulling up of the copper wire of the bond strength test specimen up to fracture of the lead-free solder used for soldering, was 9.0 N.

Bond Strength Test on Silver Electrode at High Temperatures

The bond strength test on the silver electrode at high temperatures was conducted according to the same procedures as in Example 1. In the bond strength test of this Comparative Example, a maximum load indicated by the pull gauge, in a period from the start of pulling up of the copper wire of the bond strength test specimen up to fracture of the lead-free solder used for soldering, was 2.8 N.

Specific Resistance Test

The specific resistance was measured according to the same procedures as in Example 1. The specific resistance of the lead-free solder of this Comparative Example was 17.3 μΩ·cm.

Measurement of Solidus Temperature and Liquidus Temperature

The solidus temperature and the liquidus temperature were measured according to the same procedures as in Example 1. The solidus temperature of the lead-free solder of this Example was 121° C. (394.15K). The liquidus temperature of the lead-free solder of this Example was 127° C. (400.15K).

Comparative Example 2

Preparation of Lead-Free Solder

First, 78.0 g of indium, 20.0 g of tin, and 2.0 g of silver were placed in a crucible. Thereafter, a lead-free solder ingot of this Comparative Example was prepared by the same procedures as in Example 1.

High Temperature Creep Test

The high temperature creep test was conducted according to the same procedures as in Example 1. The specimen of this Comparative Example was ruptured, after 100 hours have elapsed, and before 600 hours have elapsed, from the start of load application.

Bond Strength Test on Silver Electrode at Normal Temperature

The bond strength test on the silver electrode at normal temperature was conducted according to the same procedures as in Example 1. In the bond strength test of this Comparative Example, a maximum load indicated by the pull gauge, in a period from the start of pulling up of the copper wire of the bond strength test specimen up to fracture of the lead-free solder used for soldering, was 8.1 N.

Bond Strength Test on Silver Electrode at High Temperatures

The bond strength test on the silver electrode at high temperatures was conducted according to the same procedures as in Example 1. In the bond strength test of this Comparative Example, a maximum load indicated by the pull gauge, in a period from the start of pulling up of the copper wire of the bond strength test specimen up to fracture of the lead-free solder used for soldering, was 3.8 N.

Specific Resistance Test

The specific resistance was measured according to the same procedures as in Example 1. The specific resistance of the lead-free solder of this Comparative Example was 15.9 µΩ·cm.

Measurement of Solidus Temperature and Liquidus Temperature

The solidus temperature and the liquidus temperature were measured according to the same procedures as in Example 1. The solidus temperature of the lead-free solder of this Example was 127° C. (400.15K). The liquidus temperature of the lead-free solder of this Example was 131° C. (404.15K).

Comparative Example 3

Preparation of Lead-Free Solder

First, 83.0 g of indium, 10.0 g of tin, 5.0 g of silver, 1.0 g of antimony, and 1.0 g of copper were placed in a crucible. Thereafter, a lead-free solder ingot of this Comparative Example was prepared by the same procedures as in Example 1.

High Temperature Creep Test

The high temperature creep test was conducted according to the same procedures as in Example 1. The specimen of this Comparative Example was ruptured, after 100 hours have elapsed, and before 600 hours have elapsed, from the start of load application.

Bond Strength Test on Silver Electrode at Normal Temperature

The bond strength test on the silver electrode at normal temperature was conducted according to the same procedures as in Example 1. In the bond strength test of this Comparative Example, a maximum load indicated by the pull gauge, in a period from the start of pulling up of the copper wire of the bond strength test specimen up to fracture of the lead-free solder used for soldering, was 9.9 N.

Bond Strength Test on Silver Electrode at High Temperatures

The bond strength test on the silver electrode at high temperatures was conducted according to the same procedures as in Example 1. In the bond strength test of this Comparative Example, a maximum load indicated by the pull gauge, in a period from the start of pulling up of the copper wire of the bond strength test specimen up to fracture of the lead-free solder used for soldering, was 4.2 N.

Specific Resistance Test

The specific resistance was measured according to the same procedures as in Example 1. The specific resistance of the lead-free solder of this Comparative Example was 13.6 µΩ·cm.

Measurement of Solidus Temperature and Liquidus Temperature

The solidus temperature and the liquidus temperature were measured according to the same procedures as in Example 1. The solidus temperature of the lead-free solder of this Example was 131° C. (404.15K). The liquidus temperature of the lead-free solder of this Example was 138° C. (411.15K).

<Description of Effects>

Figure 3:
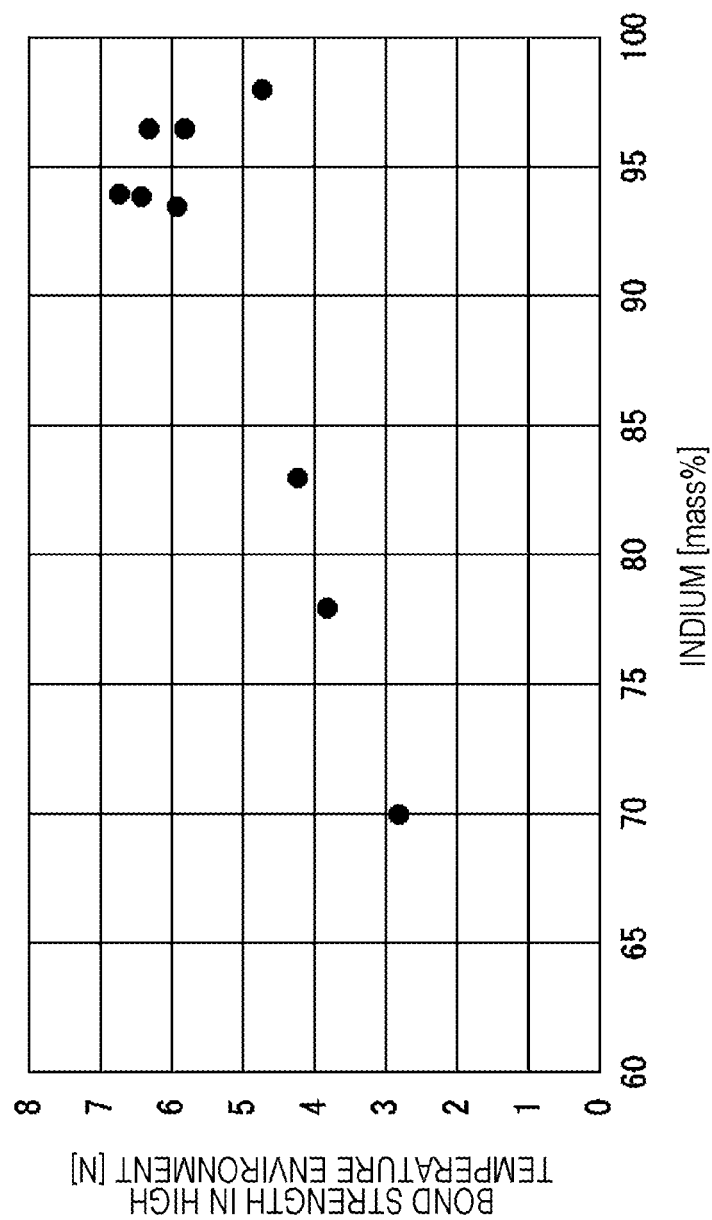
FIG. 3 is a graph illustrating relationship between results of bond strength on silver electrode tested at high temperatures, and indium content in the lead-free solders in Examples and Comparative Examples.
Figure 4:
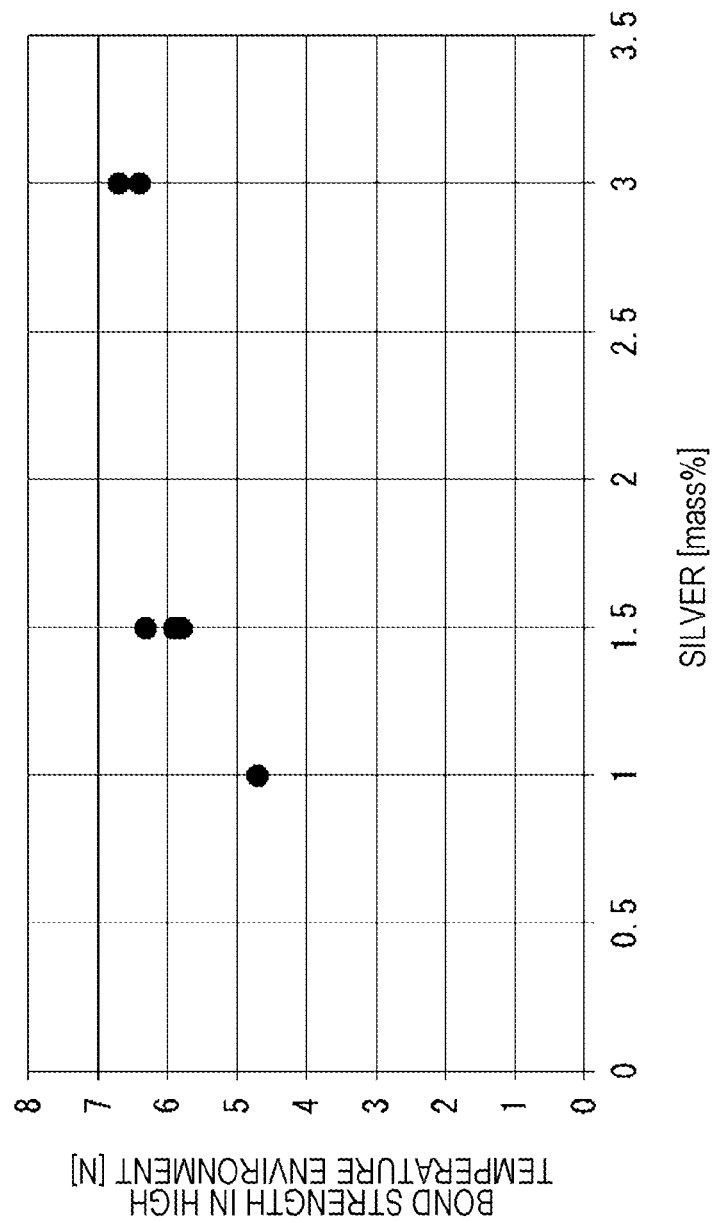
FIG. 4 is a graph illustrating relationship between results of bond strength on silver electrode tested at high temperatures, and silver content in the lead-free solders in Examples.

FIG. 1 is a table summarizing components and test results of lead-free solders in Examples and Comparative Examples. FIG. 2 is a graph illustrating relationship between time lapse and elongation, observed in high temperature creep tests in Example 1 and Comparative Example 1 of the present invention. FIG. 3 is a graph illustrating relationship between results of bond strength on the silver electrode tested at high temperatures, and indium content in the lead-free solders in Examples and Comparative Examples. FIG. 4 is a graph illustrating relationship between results of bond strength on silver electrode tested at high temperatures, and silver content in the lead-free solders in Examples. Effects of the lead-free solders of Examples will be explained below, referring to FIGS. 1 to 4.

As is clear from FIG. 1, the lead-free solders in Examples took much longer time before fracture, as compared with the lead-free solders in Comparative Examples. As is clear from FIG. 2, the lead-free solder in Example 1 demonstrated almost no creep elongation in the high temperature environment, as compared with the lead-free solder of Comparative Example 1. These results clearly demonstrate that the creep resistance in the high temperature environment of the lead-free solders in Examples is greatly superior to that of the lead-free solders in Comparative Examples.

Referring to FIG. 1, the specific resistance in Examples 1 to 3 was lower than the specific resistance in Examples 4 to 6. This teaches that the specific resistance will become small, with the mass percentage of the addition metal in the lead-free solder of the present invention suppressed to 2.5 mass % or less.

Referring to FIG. 3, the maximum load indicated by the pull gauge in a period up to fracture of the lead-free solder, observed in the bond strength test on the silver electrode at high temperatures (bond strength in high temperature environment), was high, with the mass percentage of indium adjusted to 93.5 mass % or more and 96.5 mass % or less. Hence, it is understood that the mass percentage of indium in the lead-free solder is preferably 93.5 mass % or more and 96.5 mass % or less.

Referring to FIG. 4, the maximum load indicated by the pull gauge in a period up to fracture of the lead-free solder, observed in the bond strength test on the silver electrode at high temperatures (bond strength in high temperature environment), was high, with the mass percentage of silver exceeding 1.0 mass %. Hence, it is understood that the mass percentage of silver in the lead-free solder of the present invention is preferably more than 1.0 mass % and less than 4.0 mass %.

The embodiments disclosed herein are illustrative in all respects. The scope of the present invention is not limited on the basis of the above-described embodiments, and various design changes may be made without departing from the gist of the present invention.

What is claimed is:

1. A lead-free solder comprising:
   93.5 mass % or more and 96.5 mass % or less of indium;
   1.0 mass % or more and 4.0 mass % or less of tin; and
   an addition metal being neither indium nor tin and containing 0.1 mass % or more and 4.5 mass % or less of antimony and 1.0 mass % or more and 4.0 mass % or less of silver, with a total mass percentage being 1.1 mass % or more and 5.5 mass % or less, and
   a sum of the total mass percentage of the addition metal, the mass percentage of indium, and the mass percentage of tin being 100 mass % or less.

2. The lead-free solder according to claim 1, containing 0.05 mass % or more and 4.4 mass % or less of copper, as a part of the addition metal.

* * * * *